3,086,963
POLYVINYL ALCOHOL TREATMENT
Kozo Fujii, Toyonaka City, and Makoto Shiraishi, Kurashiki City, Japan, assignors of three-fourths to Kurashiki Rayon Co., Ltd., Okayama Prefecture, Japan, a corporation of Japan, and one-fourth to Air Reduction Company Incorporated, New York, N.Y., a corporation of New York
No Drawing. Filed Jan. 5, 1960, Ser. No. 515
4 Claims. (Cl. 260—91.3)

This invention relates to the treatment of polyvinyl alcohol in order to improve the thermal stability of the polyvinyl alcohol.

Polyvinyl alcohol finds wide utility in various applications. A disadvantage generally found with polyvinyl alcohol as normally produced is that upon being subjected to elevated temperatures the polyvinyl alcohol tends to discolor. This tendency to discolor is a distinct disadvantage in many applications of the polymeric material.

It is an object of the present invention to provide a method for improving the thermal stability of polyvinyl alcohol.

Other objects will be apparent from the following description of the invention.

In accordance with the present invention, polyvinyl alcohol is treated with an alkali metal borohydride in order to improve the thermal stability of the polyvinyl alcohol. It has been found that following the treatment with the alkali metal borohydride in accordance with this invention that the polyvinyl alcohol may be subjected to elevated temperatures for extended periods without appreciable color degradation.

Polyvinyl alcohol is generally prepared by polymerizing vinyl acetate to form polyvinyl acetate and subsequently converting the polyvinyl acetate to polyvinyl alcohol. Various conversion techniques are employed. An especially preferred conversion involves the alcoholysis of the polyvinyl acetate employing an alkali metal alcoholate such as sodium methylate or an alkali metal hydroxide such as sodium hydroxide in the alcoholysis. Methanol is a preferred alcohol in such alcoholysis reactions. Other techniques are also known and employed for converting polyvinyl acetate to polyvinyl alcohol.

The polyvinyl alcohol is treated in accordance with the present invention with an alkali metal borohydride. Suitable alkali metal borohydrides include specifically sodium borohydride, potassium borohydride, and the like. In carrying out the invention, the polyvinyl alcohol is conveniently dissolved or dispersed in water or an organic solvent such as an alcohol, an ether, tetrahydrofuran, dioxane, or any mixtures of these solvents with water. Subsequently, the alkali metal borohydride is added to the solution or dispersion of polyvinyl alcohol in amount up to about 5% by weight of the polyvinyl alcohol. This resulting admixture is conveniently maintained at room temperature although higher and lower temperatures may also be employed.

The admixture of the polyvinyl alcohol solution or dispersion and the alkali metal borohydride after a short time is acidified, for example, with acetic acid or a mineral acid such as hydrochloric acid, sulfuric acid, or the like. This acidification avoids the formation of complex boron compounds with the polyvinyl alcohol, and also facilitates separation of the boron compound from the polyvinyl alcohol. The acidified mixture is conveniently filtered and washed with aqueous acetic solution to produce purified, thermally stable polyvinyl alcohol.

The following examples illustrate the invention:

*Example I*

Polyvinyl alcohol powder produced by the sodium hydroxide catalyzed methanolysis of polyvinyl acetate was dispersed in amount of 5 grams in 100 ml. of water. About 0.1 gram of sodium borohydride was added thereto. The resulting admixture was maintained at about room temperature for 6 hours. Subsequently, 10 ml. of 5% aqueous acetic acid solution was added to the polyvinyl alcohol admixture. The resulting mixture was filtered, washed with acetic acid containing water, washed with neutral water, and then dried.

Films were prepared from the thusly treated polyvinyl alcohol. The said films were heat treated at 210° C. for 3 minutes. After such heat treatment, the said film was substantially colorless. By way of contrast, films prepared from polyvinyl alcohol which was not treated in accordance with this invention upon similar heat treatment became yellowish brown in color.

*Example II*

Polyvinyl alcohol prepared as above described by the sodium hydroxide catalyzed methanolysis of polyvinyl acetate was dissolved in water to form a 5% by weight polyvinyl alcohol solution. About 0.1 gram of potassium borohydride was added to 200 grams of the said solution. The resulting admixture was maintained at room temperature for 5 hours. About 10 ml. of 5% aqueous hydrochloric acid were then added to the said admixture. The resulting admixture was dialyzed in running water for one day. Subsequently, a film was made from the treated polyvinyl alcohol which film was heat treated as described in Example I. The film was substantially colorless after the said heat treatment.

We claim:

1. The method of treating polyvinyl alcohol to improve the thermal stability thereof which comprises bringing said polyvinyl alcohol while contained in a liquid medium into contact with a stabilizing amount of an alkali metal borohydride, acidifying the resulting polyvinyl alcohol/liquid medium/alkali metal borohydride mixture, and recovering from said mixture polyvinyl alcohol having improved thermal stability.

2. The method of preparing polyvinyl alcohol having improved thermal stability which comprises bringing said polyvinyl alcohol into contact with a stabilizing amount of an alkali metal borohydride, acidifying the resulting polyvinyl alcohol alkali metal borohydride mixture, and recovering from said mixture polyvinyl alcohol having improved thermal stability.

3. The method of claim 2 wherein said alkali metal borohydride is sodium borohydride.

4. The method of claim 2 wherein said alkali metal borohydride is potassium borohydride.

References Cited in the file of this patent

UNITED STATES PATENTS

| | | |
|---|---|---|
| 1,920,564 | Jochuim et al. | Aug. 1, 1933 |
| 2,457,603 | Salzberg et al. | Dec. 28, 1948 |
| 2,554,850 | Binda | May 29, 1951 |